Feb. 26, 1957 — H. W. SHELDRICK ET AL — 2,783,053
COLLAPSIBLE STROLLER
Filed Feb. 15, 1956 — 4 Sheets-Sheet 2

INVENTORS
HENRY W. SHELDRICK
PHILIP T. BAUMGARTNER

BY
ATTORNEYS

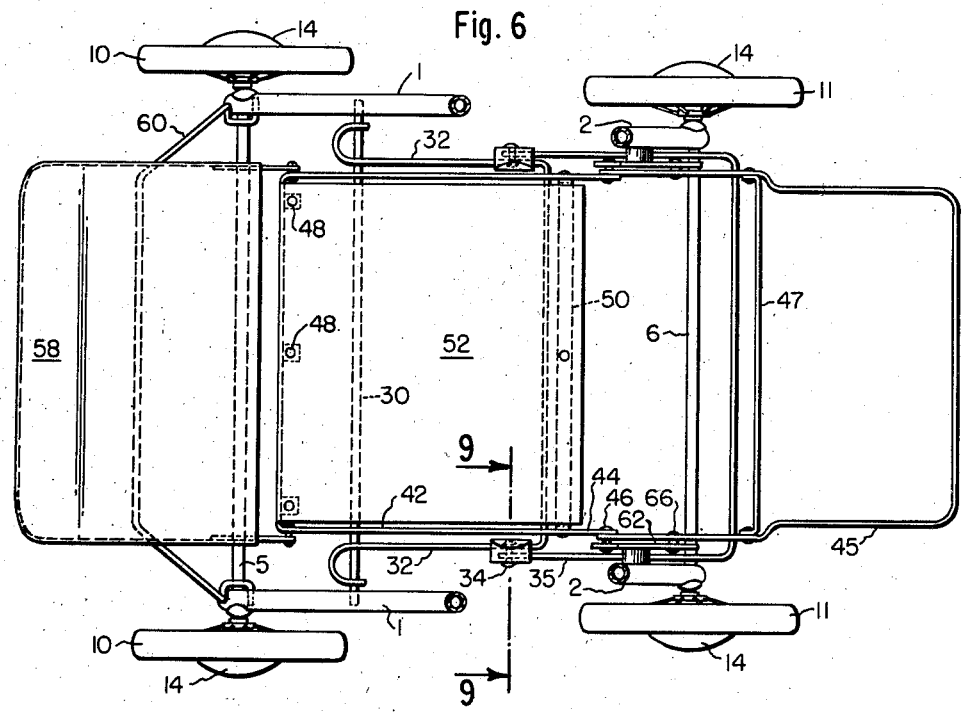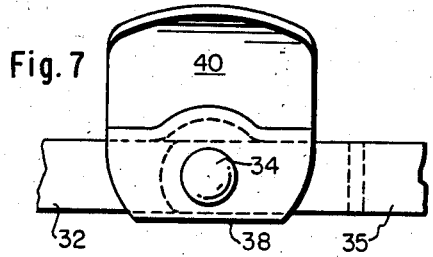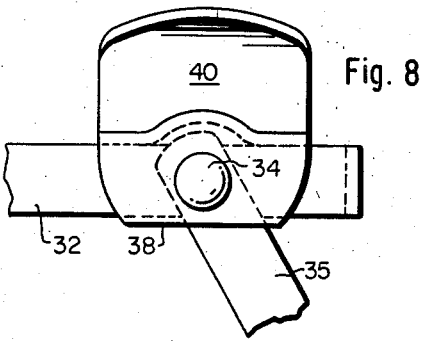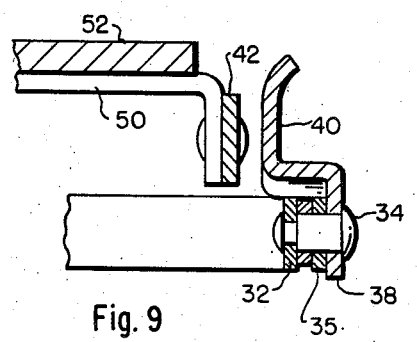
Feb. 26, 1957 — H. W. SHELDRICK ET AL — 2,783,053
COLLAPSIBLE STROLLER
Filed Feb. 15, 1956 — 4 Sheets-Sheet 3
Fig. 6
Fig. 7
Fig. 8
Fig. 9
INVENTORS
HENRY W. SHELDRICK
PHILIP T. BAUMGARTNER
ATTORNEYS

INVENTORS
HENRY W. SHELDRICK
PHILIP T. BAUMGARTNER

United States Patent Office 2,783,053
Patented Feb. 26, 1957

2,783,053

COLLAPSIBLE STROLLER

Henry W. Sheldrick and Philip T. Baumgartner, Gardner, Mass., assignors to Collier Keyworth Company, Gardner, Mass., a corporation of Massachusetts Application February 15, 1956, Serial No. 565,728

8 Claims. (Cl. 280—41)

Conventional strollers of the collapsible type are subject to several well known disadvantages such for example as poor balance and consequent instability when occupied in reclined position, accidental collapsing when traveling over curbings and uneven terrain, the difficulty and inconvenience in carrying them when collapsed, and the lack of clearance between the legs of one pushing the stroller and the head of the occupant, particularly when the latter is in a reclining position, and the consequent difficulty of manipulation.

The principal objects of the present invention are to provide a collapsible stroller which is so constructed as to overcome the aforementioned difficulties and yet retain the advantageous features of conventional strollers, and to provide a stroller which is of strong and durable construction, capable of withstanding severe usage, and which can be economically manufactured.

Further objects relate to various features of construction and will be apparent from a consideration of the following description and the accompanying drawings, wherein:

Fig. 6 is a section on the line 6—6 of Fig. 2;

Fig. 7 is an enlarged detail showing in plan the elbow stop for the pivotally connected seat support when the stroller is in erected position;

Fig. 8 is a view similar to Fig. 7 but showing the parts when the stroller is in collapsible position;

Fig. 9 is an enlarged section on the line 9—9 of Fig. 6;

Figure 2:
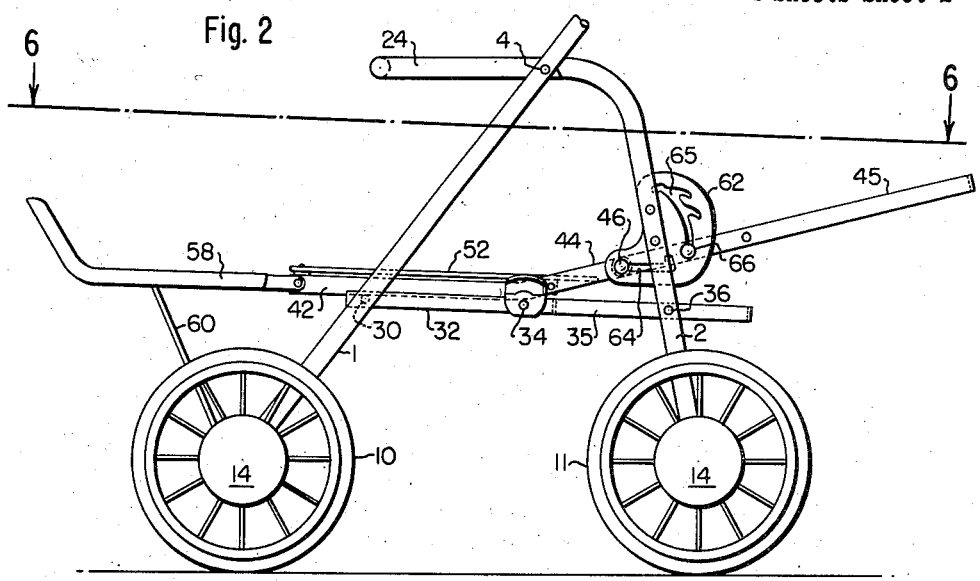
Fig. 2 is a view similar to Fig. 1 but showing the back and footrest set for a reclining position.
Figure 3:
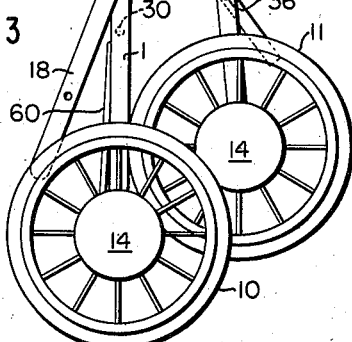
Fig. 3 is a side elevation showing the stroller in collapsed position.
Figure 11:
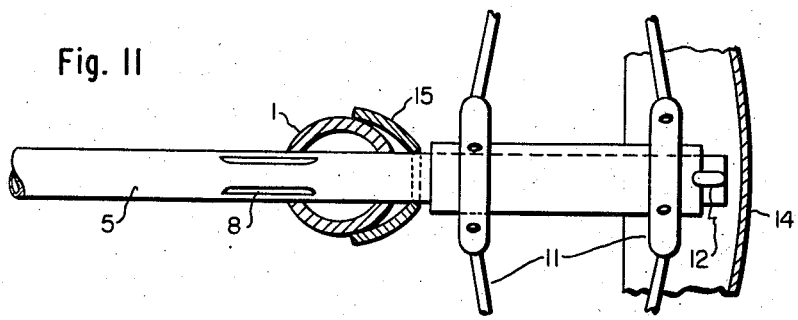
Fig. 11 is a section on the line 11—11 of Fig. 10.
Figure 12:
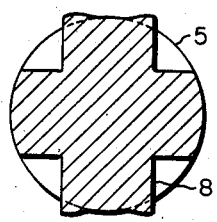
Fig. 12 is an enlarged section on the line 12—12 of Fig. 10.

The embodiment herein shown for the purpose of illustration comprises a pair of front legs 1 and rear legs 2 pivotally interconnected by a stud or rivet 4 so that they may be swung from an erected position (Figs. 1, 2 and 6) to a collapsed position (Fig. 3). These legs are preferably made from tubular stock and their lower ends are drilled to provide aligned openings to receive the front and rear axles 5 and 6. In order to hold these axles against rotation their end portions at the entrance to the openings are upset or deformed, as indicated at 8 (Figs. 10 to 12), to provide a press fit locking the axle against rotation. The projecting ends of the axles rotatably support the front and rear wheels 10 and 11 which are held on by cotter pins 12 covered by conventional hub caps 14 secured to the spokes. The lower ends of the legs 1 and 2 are held against outward spreading or axial movement by concavo-convex washers 15 (Figs. 10 and 11) juxtaposed to the outer faces of the legs with their inner peripheries biting into the axles so as to oppose outward movement.

The upper ends of the front legs 1 are pivotally connected with an inverted U-shaped handle 18 and each pivotal connection includes a retractable spring-pressed pin 20, the inner end of which projects into one of a plurality of openings in a plate 21 carried by the upper end of the leg 1, thereby permitting the angular position of the handle 18 to be adjusted. Three such positions of adjustment are here shown, but it is to be understood that by providing more openings in the plate 21 a greater number of positions of adjustment may be provided. The upper part of each leg of the handle 18 is provided with spaced openings which receive the inturned ends of a removable hood or shade 22, thus permitting the hood to be mounted in any one of several positions to suit the comfort of the occupant.

Figure 4:
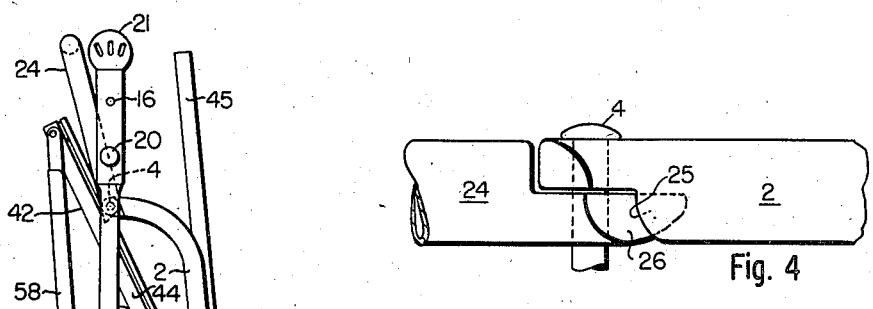
Fig. 4 is an enlarged detail showing in plan the knuckle-like joint between the front safety bar and rear legs.
Figure 5:
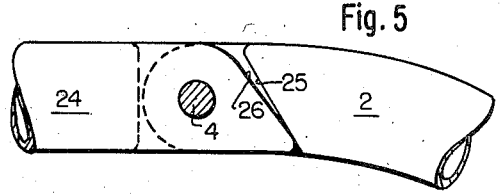
Fig. 5 is a view similar to Fig. 4 but showing the parts in elevation.

The rivet 4 pivotally connects the upper ends of the rear legs 2 with a U-shaped safety bar 24 which may be swung upwardly, but which normally is disposed in a horizontal position due to the engagement of the bias shoulders 25 and 26 formed on the ends of the legs 2 and bar 24 respectively, as shown in Figs. 4 and 5. As indicated by the dot and dash lines of Fig. 1, the safety bar 24 may carry side and front panels 28 and 29 which are effective to prevent a small child from squirming out of the stroller.

Between the rivet 4 and front wheels 10 is a transversely extending rod 30 (Fig. 6), the ends of which are secured to the front legs 1, and pivotally secured to this rod are the hook ends of a U-shaped front member 32. Rivets 34 pivotally connect the inner end of the member 32 to the ends of the legs of a U-shaped rear member 35, the opposite ends of which are pivotally connected by rivets 36 to the rear legs 2. Clamped between the head of rivet 34 and the legs of the member 35 is an upstanding member 38 (Figs. 7 to 9) having an L-shaped flange 40 overhanging the members 32 and 35, the horizontal wing of the flange 40 being dished upwardly between its ends to provide a clearance for the end of the member 35 when swung clockwise as shown in Fig. 8. The under surface of each flange 40 when in engagement with the upper edges of front and rear members 32 and 35, as shown in Figs. 7 and 9, provides a stop preventing further rotation about pivots 34 and thus maintains the stroller in erected position, but when the closed rear portion of the member 35 is forced downwardly (as indicated by the arrow in Fig. 1), rotating about pivots 36 and thereby raising the pivots 34 and the closed end of member 32, causing the latter to rotate about the rod 30, the legs 1 and 2 simultaneously swing inwardly toward collapsed position.

A seat support comprising a rectangular frame member 42 rests on the bar 30 and the rear sides of this frame member are formed with upwardly bent integral extensions 44 (Figs. 1–3 and 6) which are pivotally connected with the lower ends of a U-shaped back rest 45 by rivets 46, and a crossbar 47 is provided to secure the desired degree of rigidity of the back rest. Secured to the front and rear parts of the frame 42 are lugs 48 (Fig. 6) and a cross piece 50 to which a rigid panel or seat 52 is riveted or otherwise secured. Both the back rest 45 and the seat 42 are provided with conventional cushions 53 and 54, and if desired the rear of the back rest may carry a purse pocket 55 or the like, as indicated by the dot and dash lines of Fig. 1.

Figure 1:
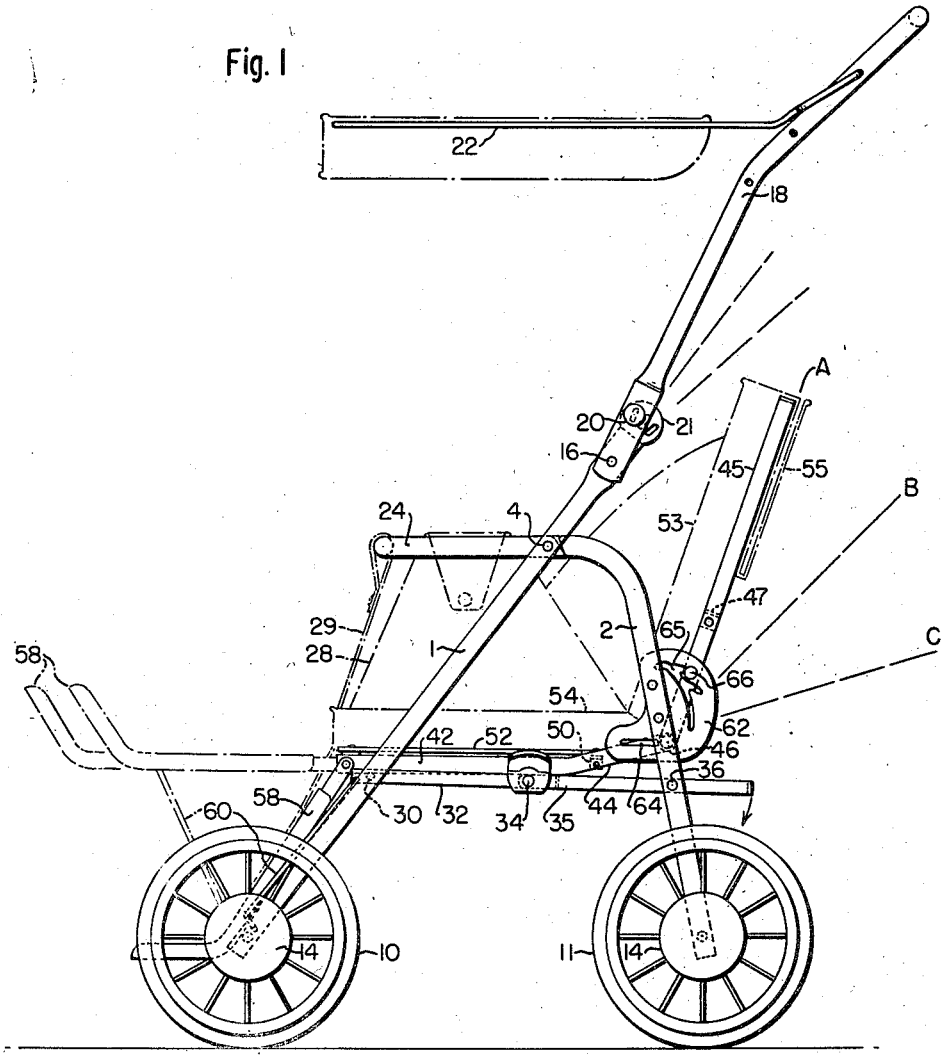
Fig. 1 is a side elevation of a stroller constructed in accordance with the present invention, the back and footrest being shown in upright position.
Figure 3A:
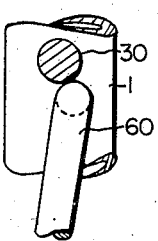
Fig. 3a is a detail showing the manner in which the parts may be locked when the stroller is in collapsed position.
Figure 10:
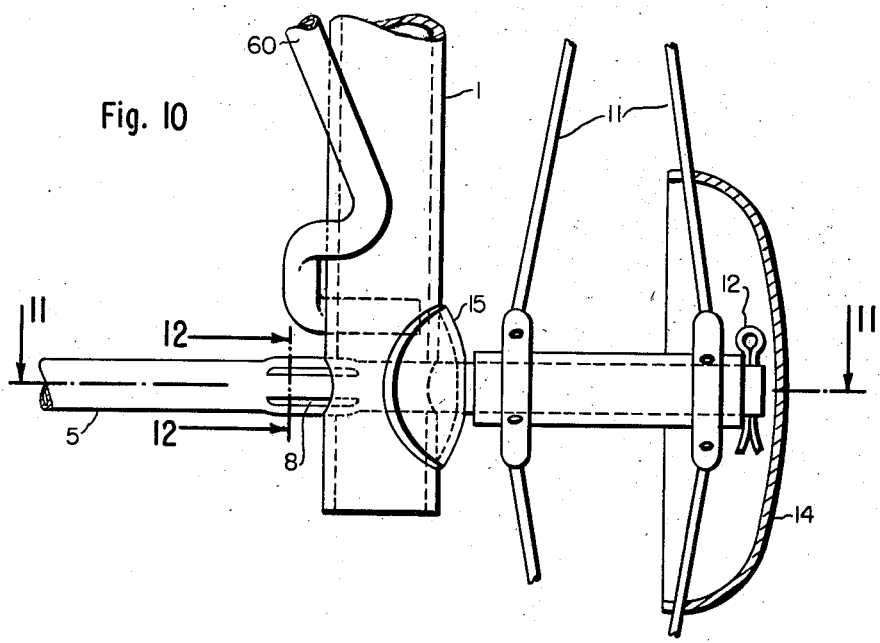
Fig. 10 is an enlarged detail showing in plan the front axle and associated parts.

The front of the frame member 42 is pivotally connected to the upper end of a footrest 58 which may be swung from a depending position, shown by the full lines of Fig. 1, to a substantially horizontal position, indicated by the dot and dash lines, and the ends of a U-shaped bail or bracket 60 are pivotally connected to the front legs 1, as shown in Fig. 10, so as to provide a retractable support for holding the leg rest in horizontal position. The bail 60 is of a resilient stock and the length of its legs is such that when swung upwardly (clockwise in Figs. 2 and 3), its closed end contacts the rod 30, as shown in Fig. 3a, and due to its resiliency the bail may be snapped past the rod 30 so as releasably to lock the parts in collapsed position.

Referring to Figs. 1 to 3 and 6, a cam plate 62 is secured to each rear leg 2 with its body portion spaced therefrom to provide a clearance, and each cam plate is formed with a horizontal slot 64, the outer end of which terminates in an upwardly directed offset portion, and an arcuate inclined slot 65 having spaced upper and lower branches. The pivots 46 project into the horizontal slots 64, thus providing a pivotal support for the seat and permitting a limited sliding movement, and lugs 66 carried by the lower part of the back rest project into the slots 65. The shape and arrangement of the slots 64 and 65 are such that when the back rest is swung to an upright position (A), the pivot 46 swings into the offset portion of the slot 64 and the lug 66 is within the upper branch of the slot 65; and when the back rest is swung from upright position, the seat and leg rest are slid forwardly; and when the back rest is swung from reclining position (C), the seat and leg rest are slid rearwardly, thus automatically adjusting the position of the seat, leg rest and back rest in accordance with the position of the occupant. The lower branch of slot 65 and its lower end portion are shaped and arranged so that the back rest 45 may be held in any of several positions, here shown as positions A, B and C, it being understood that additional branch slots may be provided if a greater number of positions is desired.

Collapsing of the stroller is accomplished simply by pressing downwardly and inwardly on the closed end of the rear member 35, as indicated by the arrow in Fig. 1, thus causing the member 35 to swing downwardly about pivot 34 and simultaneously causing the legs 1 and 2 to swing together about the pivot 4. Further movement swings the member 32 upwardly about pivot 30, carrying with it the seat structure and leg rest and by continuing such movement the stroller is completely collapsed after which the handle 18 may be swung downwardly, the bail 60 swung to locking position and the safety bar 24 swung upwardly to provide a carrying handle as illustrated in Fig. 3. By reversing the foregoing the stroller may be quickly erected and as the seat structure swings downwardly about pivots 46 the outwardly curved ends of the flanges 40 provide a guide for the frame 42, thus assuring that the frame will swing into correct position on the bar 30.

It will be observed that with the construction and arrangement herein shown the handle 18 provides a greater leverage over the rear wheels and hence greater ease in changing the direction of travel. Consequently less effort is required to raise the front wheels when going over a curb or uneven terrain. Since the seat structure and associated parts are automatically adjusted in accordance with the position of the occupant, a greater degree of stability is achieved and the proper balance is at all times maintained. Moreover, since the back rest moves inwardly when in reclining position, a greater clearance is provided between the reclined back and legs of a person pushing the stroller.

A further feature is the provision of the pivotally connected members 32, 35 and associated flange 40 which not only respond to the weight of the occupant in providing a positive lock preventing accidental collapsing of the stroller, but also provide a guide for the seat which properly locates it when erecting the stroller. The provision of a safety bar which also serves as a carrying handle in conjunction with the foot rest support which also provides a releasable lock permits the collapsed stroller to be conveniently carried in congested traffic.

While we have shown and described one desirable embodiment of the invention, it is to be understood that this disclosure is for the purpose of illustration and that various changes and modifications may be made without departing from the spirit and scope of the invention as set forth in the appended claims.

We claim:

1. A collapsible stroller comprising a pair of front and rear legs pivotally interconnected adjacent to their upper ends, the lower ends of the legs carrying wheels, the upper ends of one pair of legs being connected with an inverted U-shaped handle, front and rear pivotally interconnected members pivoted to the front and rear legs between their pivotal connections and lower ends, a seat support slidable on the front member, a back rest pivotally connected to the rear end of said seat support, and means carried by said rear legs and back rest operative to slide said seat support forwardly and rearwardly when said back rest is swung toward and from horizontal position, thereby to maintain the stability of the stroller when the position of the occupant is shifted to and from reclining position.

2. A collapsible stroller comprising a pair of front and rear legs pivotally interconnected adjacent to their upper ends, the lower ends of the legs carrying wheels, the upper ends of one pair of legs being connected with an inverted U-shaped handle, front and rear pivotally interconnected members pivoted to the front and rear legs between their pivotal connections and lower ends, a seat support slidable on the front member, a leg rest pivotally connected to the front of said seat support, releasable means for holding said leg rest in a substantially horizontal position, a back rest pivotally connected to the rear end of said seat support, and means carried by said rear legs and back rest operative to slide said seat support and leg rest forwardly and rearwardly when said back rest is swung toward and from horizontal position, thereby to maintain the stability of the stroller when the position of the occupant is shifted to and from reclining position.

3. A collapsible stroller comprising a pair of front and rear legs pivotally interconnected adjacent to their upper ends, the lower ends of the legs carrying wheels, the upper ends of one pair of legs being connected with an inverted U-shaped handle, front and rear pivotally interconnected members pivoted to the front and rear legs between their pivotal connections and lower ends, a seat support slidable on the front member, a back rest pivotally connected to the rear end of said seat support, and interengaging guide means carried by said rear legs and back rest operative releasably to hold said back rest in a selected position of adjustment and to slide said seat support forwardly and rearwardly when said back rest is released and swung toward and from horizontal position, thereby to maintain the stability of the stroller when the position of the occupant is shifted to and from reclining position.

4. A collapsible stroller comprising a pair of front and rear legs pivotally interconnected adjacent to their upper ends, the lower ends of the legs carrying wheels, the upper ends of one pair of legs being connected with an inverted U-shaped handle, front and rear pivotally interconnected members pivoted to the front and rear legs between their pivotal connections and lower ends, a seat support slidable on the front member, a back rest pivotally connected to the rear end of said seat support, a slotted cam-like member carried by each rear leg, and spaced lugs carried by the lower end portions of said back rest projecting into the slots of said cam-like member, said slots being shaped and arranged so as releasably to hold said back rest in a selected position of adjustment and when said back rest is released to slide said seat support forwardly and rearwardly when said back rest is swung toward and from horizontal position, thereby to maintain the stability of the stroller when the position of the occupant is shifted to and from reclining position.

5. A stroller as set forth in claim 1, wherein the upper ends of said rear legs are connected with a forwardly extending U-shaped member providing a horizontally disposed safety bar above the seat support.

6. A stroller as set forth in claim 1, wherein the upper ends of said rear legs are pivotally connected with a forwardly extending U-shaped member providing a horizontally disposed safety bar above said seat support when said stroller is in erected position, said safety bar being capable of swinging upwardly to provide a carrying handle when the stroller is in collapsed position.

7. A stroller as set forth in claim 1, wherein said front and rear pivotally interconnected members carry inwardly projecting flanges providing stops engageable with the upper edges of said interconnected members and are so arranged that the weight of an occupant prevents collapsing of said stroller.

8. A stroller as set forth in claim 1, wherein said front and rear pivotally interconnected members carry inwardly projecting L-shaped flanges providing guides for said seat support and stops engageable with the upper edges of said interconnected members and arranged so that the weight of an occupant prevents collapsing of said stroller.

References Cited in the file of this patent

UNITED STATES PATENTS

| | | |
|---|---|---|
| 2,486,917 | Boudreau | Nov. 1, 1949 |
| 2,607,926 | De Puy | Aug. 26, 1952 |
| 2,685,325 | Webster | Aug. 3, 1954 |